United States Patent
Gibbs

(10) Patent No.: US 7,583,951 B2
(45) Date of Patent: Sep. 1, 2009

(54) VIRTUAL BATTERIES FOR WIRELESS COMMUNICATION DEVICE

(75) Inventor: Benjamin K. Gibbs, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 622 days.

(21) Appl. No.: 11/404,691

(22) Filed: Apr. 14, 2006

(65) Prior Publication Data
US 2007/0243852 A1    Oct. 18, 2007

(51) Int. Cl.
*H04B 1/16* (2006.01)

(52) U.S. Cl. .......... 455/343.5; 455/67.1; 455/425; 455/550.1; 370/311; 713/320

(58) Field of Classification Search .......... 455/67.11, 455/75, 76, 127.1, 127.5, 343.1, 343.2, 343.5, 455/425, 550.1, 572, 574; 370/311; 713/320, 713/322–324, 340
See application file for complete search history.

(56) References Cited

U.S. PATENT DOCUMENTS

| | | | |
|---|---|---|---|
| 5,684,404 A | 11/1997 | Millar | 324/426 |
| 5,870,685 A | 2/1999 | Flynn | 455/573 |
| 6,314,308 B1 | 11/2001 | Sheynblat et al. | 455/574 |
| 6,345,180 B1 | 2/2002 | Reichelt | 455/404 |
| 6,408,196 B2 | 6/2002 | Sheynblat et al. | 455/574 |
| 6,427,072 B1 | 7/2002 | Reichelt | 455/404 |
| 6,668,179 B2 | 12/2003 | Jiang | 455/572 |
| 6,678,538 B1 | 1/2004 | Koizumi | 455/574 |
| 7,057,372 B2 * | 6/2006 | Chen et al. | 320/106 |
| 7,162,279 B2 * | 1/2007 | Gupta | 455/574 |
| 7,233,127 B2 * | 6/2007 | Chen et al. | 320/106 |
| 7,260,728 B2 * | 8/2007 | Chang et al. | 713/300 |
| 7,308,586 B2 * | 12/2007 | Oshins et al. | 713/300 |
| 7,359,738 B2 * | 4/2008 | Daniels et al. | 455/569.1 |
| 2002/0177475 A1 | 11/2002 | Park | 455/574 |
| 2007/0011421 A1 * | 1/2007 | Keller et al. | 711/165 |

FOREIGN PATENT DOCUMENTS

| | | |
|---|---|---|
| FR | 2810809 | 12/2001 |
| JP | 2002320344 | 10/2002 |

OTHER PUBLICATIONS

D. Freeman & N. Salamina, "Today's PDAs Require Smart Battery Management," Portable Design, Sep. 2002 pp. 50-52.
S. Ohr, "TI Battery Chips Support Cell Phone Fuel Gauges (Texas Instruments bq2019 Power Minder and Texas Instruments bq2400x Poer Controllers)(Product Announcement)," CMP Media Inc., 2000 one page. "DS2751 Multichemistry Battery Fuel Gauge", Dallas Semiconductor, Feb. 2005, pp. 1-19.

* cited by examiner

*Primary Examiner*—Nhan T Le
(74) *Attorney, Agent, or Firm*—Scot A. Reader

(57) ABSTRACT

The present invention provides virtual batteries for a wireless communication device. Generally speaking, a virtual battery is a logical construct on a wireless communication device that powers a defined set of wireless communication device applications and has a defined power budget from one or more physical batteries on the device. Through judicious assignment of wireless communication device applications and power budgets to virtual batteries, a user of a wireless communication device can efficiently allocate power among competing wireless communication device applications.

21 Claims, 4 Drawing Sheets

Figure 3

```
VIRTUAL BATTERY ID: RES    POWER ALLOCATION: 25%

POWERED APPLICATIONS:      DEVICE SETTINGS:

→ CALLING                  BACKLIGHT BRIGHTNESS: 1
→ TEXT MESSAGING           BACKLIGHT DURATION: 5s
  MULTIMEDIA MESSAGING     SWITCH-OFF LCD: 10s
  MUSIC PLAYER
  VIDEO PLAYER
  GAMES
  CAMERA                                        300
```

Figure 4

| VBID | POWERED APPS | POWER BUDGET | DEVICE SETTINGS |
|---|---|---|---|
| MAIN | ALL | 75 | 2, 10, 20 |
| RES | CALL, TEXT | 25 | 1, 5, 10 |

230

VIRTUAL BATTERIES FOR WIRELESS COMMUNICATION DEVICE

BACKGROUND OF THE INVENTION

The present invention relates to protection of essential wireless communication device applications from battery exhaustion and, more particularly, to methods and systems that provide a user broad flexibility in defining essential wireless communication device applications and the battery power reserved for such applications.

Wireless communication devices, such as mobile phones, personal data assistants and pocket PCs are being equipped with more and more collateral applications. For example, many recent vintage mobile phones support entertainment and social applications such as digital photography, music and video recording and playback and video gaming. Many of these collateral applications invoke multimedia technologies that consume substantial battery power. Use of these collateral applications can therefore easily result in a user inadvertently exhausting the battery of the wireless communication device and losing the ability to use core communication applications, such as telephone calling and text messaging. In some circumstances, a dead battery can prevent a user from sending or receiving emergency or other critical communications.

Attempts have been made to protect core communication applications of mobile electronic devices by reserving battery power for these applications. However, these attempts have fallen short. One prior approach disables activation of certain user preferences such as display backlight when battery power falls below a certain threshold. This approach does not adequately protect core communication applications since only certain user preferences are disabled. No action is taken to prevent a long-running or power-intensive collateral application from running the battery flat. Other prior approaches have not provided the user sufficient flexibility to define which applications the user regards as essential, power budgets for such applications or related settings. Moreover, prior approaches have generally failed to keep the user adequately informed about how much power is available to essential and nonessential applications, which can cause the user to inefficiently use available power in certain circumstances.

SUMMARY OF THE INVENTION

The present invention, in a basic feature, provides virtual batteries for a wireless communication device. Generally speaking, a virtual battery is a logical construct on a wireless communication device that powers a defined set of wireless communication device applications and has a defined power budget from one or more physical batteries on the device. Through judicious assignment of wireless communication device applications and power budgets to virtual batteries, a user of a wireless communication device can efficiently allocate power among competing applications. For example, a user can configure a virtual battery and restrict use of its power budget to applications the user regards as essential such as telephone calling and text messaging to protect those applications against battery drain from applications the user regards as nonessential such as digital cameras, music and video recording and playback and video games.

In one aspect of the present invention, a wireless communication device comprises a user interface adopted to accept inputs from a user and a processor communicatively coupled with the user interface and adapted to configure a first virtual battery based on the inputs. The inputs may identify a subset of applications to be powered by the first virtual battery and a first power budget for the first virtual battery. The applications may include one or more of phone calls and text messaging and the first power budget may identify a percentage of overall capacity of one or more physical batteries on the device. The processor may cause to be displayed on the user interface and continuously updated an indication of available power in the first virtual battery. The processor may reduce a second power budget of a second virtual battery that powers all applications based on the first power budget. The processor may also cause to be displayed on the user interface and continuously updated an indication of available power in the second virtual battery.

In another aspect of the present invention, a wireless communication device comprises a memory adapted to store an application and a processor communicatively coupled to the memory and adapted to regulate access of a user to the application based on availability of power in one or more virtual batteries adapted to power the application. The processor may be adapted after granting access to the application to continuously monitor the virtual batteries and terminate the application upon detecting unavailability of power in all virtual batteries adapted to power the application. The processor may be further adapted to provide a warning on the user interface upon detecting a predetermined low power level in one of the virtual batteries adapted to power the application. If power is available in multiple virtual batteries adapted to power the application and one of them powers all applications, power may be allocated from the virtual battery that powers all applications. Additionally, upon detecting unavailability of power in a virtual battery that powers all applications, the processor may make changes to device settings that improve power conservation.

These and other aspects of the invention will be better understood by reference to the following detailed description taken in conjunction with the drawings that are briefly described below. Of course, the scope of the invention is defined by the appended claims.

BRIEF DESCRIPTION OF THE DRAWINGS

FIG. 3 shows a virtual battery configuration user screen in one embodiment of the invention.

FIG. 4 shows a table for storing virtual battery settings in one embodiment of the invention.

DETAILED DESCRIPTION OF A PREFERRED EMBODIMENT

Figure 1:
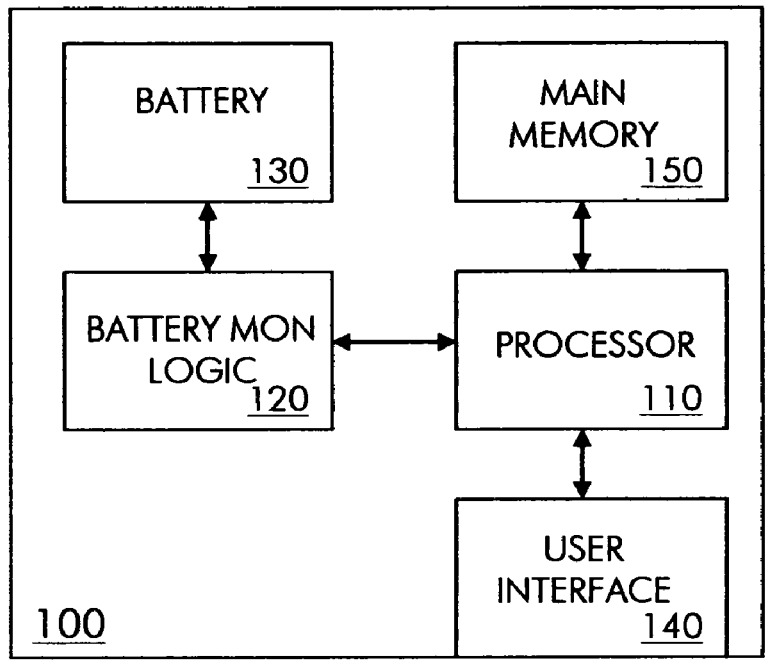
FIG. 1 is a block diagram showing a wireless communication device in one embodiment of the invention.

In FIG. 1, a wireless communication device 100 is shown in one embodiment of the invention. Device 100 may be, for example, a mobile phone, a personal data assistant or a pocket PC. Device 100 includes a processor 110 communicatively coupled between battery monitoring logic 120, user interface 140 and main memory 150. Processor 110 is a general purpose processor adapted to execute instructions of software stored in main memory 150 and interact with elements 120 and 140 to provide applications and functions supported by device 100. Device applications may include core communication applications such as sending and receiving telephone calls and text messages as well as collateral applications such as digital photography, music and video recording and playback and video gaming. Device functions may include user preferences such as display backlight. Main memory 150 may be a flash memory. Naturally, device 100 includes other elements such as a wireless interface (not shown) that is communicatively coupled with processor 110 and adapted to exchange data with one or more communication networks.

Processor 110 interfaces with battery monitoring logic 120. Battery monitoring logic 120 includes logic adopted to monitor the remaining electric charge on battery 130 and to report to processor 110 remaining capacity. In some embodiments, logic 120 measures the voltage or current of battery 130, calculates a remaining percentage of overall battery capacity by comparing the measured level with a full battery level and reports the percentage to processor 110. In other embodiments, logic 120 supplies raw voltage or current measurements to processor 110 and processor calculates the percentage. In some embodiments, measurement and reporting is performed by logic 120 responsive to requests received from processor 110. In other embodiments, measurement and reporting is performed by logic 120 independent of any request. In either event, measurement and reporting are performed with sufficient frequency that processor 110 has substantially real-time information on the state of battery 130. In some embodiments, logic 120 is implemented in custom circuitry. In other embodiments, logic 120 is implemented using a general purpose processor running software, and may be subsumed within processor 110.

In some embodiments, battery 130 includes one or more rechargeable batteries, such as lithium polymer (Li-Poly), lithium ion (Li-Ion), nickel metal hydride (NiMH) or nickel cadmium (NiCad) batteries, for example. In other embodiments, battery 130 includes one or more disposable batteries, such as a zinc-carbon batteries. Battery 130 is a physical battery having capacity to store electric charge for powering device 100, as opposed to a virtual battery which is a logical construct configured on device 100 as outlined herein.

User interface 140 includes a display and a mechanism for user input such as a keypad or a touch-sensitive navigation tool, or both. In some embodiments, the display is a liquid crystal display (LCD). In some embodiments, user interface 140 also includes a microphone and speaker for communicating speech and other sounds.

Figure 2:
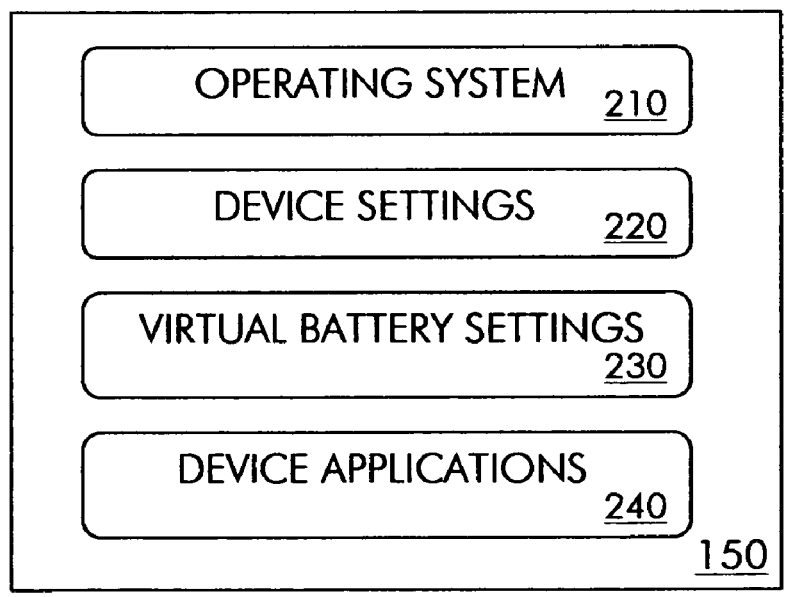
FIG. 2 is a block diagram showing software elements within a wireless communication device in one embodiment of the invention.

Turning to FIG. 2, software elements within wireless communication device 100 are shown in one embodiment of the invention. Software elements are stored in main memory 150 and are executed on processor 110. Software elements include operating system 210, device settings 220, virtual battery settings 230 and device applications 240. Operating system 210 includes software adopted to regulate the use of battery 130 by wireless communication device applications and functions. Device settings 220 include a multiple of settings that affect, for example, how device 200 interfaces with the user. Purely by way of example, device settings 220 may affect language, text, volume, ring tone and screen saver. Some of device settings 220 may impact directly on how much power is consumed on device 200, such as display backlight brightness, display backlight switch-off time and display switch-off time. Virtual battery settings 230 define one or more virtual batteries that each power a defined set of device applications and have a defined power allocation from battery 130 among other characteristics. Device applications 240 include communication and entertainment/social software such as telephone calling software, text messaging software, digital camera software, music and video recording and playback software and video gaming software.

Turning now to FIG. 3, an exemplary virtual battery configuration user screen 300 is shown in one embodiment of the invention. User screen 300 is presented to a user of device 100 on a display of user interface 140 in response to user selections made from a menu on other user screens. Menu selections on user screen 300 are made to configure the virtual battery. As illustrated on screen 300, an exemplary virtual battery has an identity RES and a power budget of 25%. The virtual battery RES further has a set of powered device applications indicated by directional arrows that consists of a subset of all device applications. In the example shown, the powered applications are calling and text messaging. The virtual battery RES further has associated device settings. In the example shown, the device settings include a backlight brightness of one, a backlight duration of five seconds and a display switch-off of ten seconds. Menu selections are made by user, for example, through inputs on a keypad or manipulation of a touch-sensitive navigation tool.

In other embodiments, a power budget for a virtual battery is expressed on-screen as usage times of one or more powered device applications and a power budget percentage is derivative of the usage times. For example, the user may input a talk-time in minutes for the calling application and operating system 210 may support software adapted to convert talk-time minutes into a power budget percentage using, for example, industry data on battery consumption rates for a typical call. In either event, the power budget for a virtual battery represents a share of overall capacity of battery 130 allocated to the device applications powered by the virtual battery.

Referring to FIG. 4, an exemplary table for storing virtual battery settings 230 is shown in one embodiment of the invention. The table may be read in conjunction with FIG. 3. Initially, a default virtual battery having an identity MAIN is preconfigured on wireless communication device 100 to power all device applications, as well as device functions such as display backlight. The virtual battery MAIN has an initial power budget of 100% and associated device settings including a backlight brightness of two, a backlight duration of ten seconds and a display switch-off of twenty seconds. In response to inputs received on user interface 140, operating system 210 causes to be configured in the table a virtual battery RES that powers select device applications, in particular calling (CALL) and text messaging (TEXT). The virtual battery RES has a power budget of 25% and associated device settings including a backlight brightness of one, a backlight duration of five seconds and a display switch-off of ten seconds. Operating system 210 reduces the power budget of the virtual battery MAIN to 75% to prevent oversubscription of battery 130. Naturally, in other embodiments virtual battery settings 230 may be stored in multiple interlinked tables, or in other forms.

Operating system 210 proceeds to apply virtual battery settings 230 to allocate power on device 100. Continuing the above example, all device applications and functions of device 100 may draw on virtual battery MAIN, but only select device applications CALL and TEXT may draw on virtual battery RES. Moreover, all device applications attempt to draw on virtual battery MAIN as a matter of first resort. Accordingly, operating system 210 disables applications such as multimedia messaging, music and video playing, games and camera once 75% of battery 130, as continually measured and reported by logic 120 to processor 110, has been exhausted. However, drawing on virtual battery RES, selected applications CALL and TEXT continue until battery 130 has been completely exhausted. Moreover, operating system 210 applies the device settings associated with the virtual battery that is presently invoked to update device settings 220. In particular, the device settings that are adapted to control backlight brightness, backlight duration and display switch-off transition to more power-conserving settings once virtual battery MAIN has been exhausted and virtual battery RES has been invoked.

In some embodiments, a user may define additional virtual batteries each having a defined identity, powered applications, power budget and device settings, as well as a hierarchy for invoking various virtual batteries in the event that an application is powered by multiple virtual batteries having power. Of course, in response to configuration of additional virtual batteries, operating system 210 further reduces the power budget of virtual battery MAIN to prevent oversubscription of battery 130. In other embodiments, virtual batteries may be limited to a main battery and a reserve battery.

In still other embodiments, one or more of the identity, powered applications and power budget assigned to a virtual battery may be defined independent of a user, that is, preconfigured. For example, one or more of the identity, powered applications and power budget assigned to a virtual battery may be specified in an over-air transmission received on device 100 via a wireless interface on device 100. The virtual battery profile in that event may be determined by a remote administrator.

Figure 5:
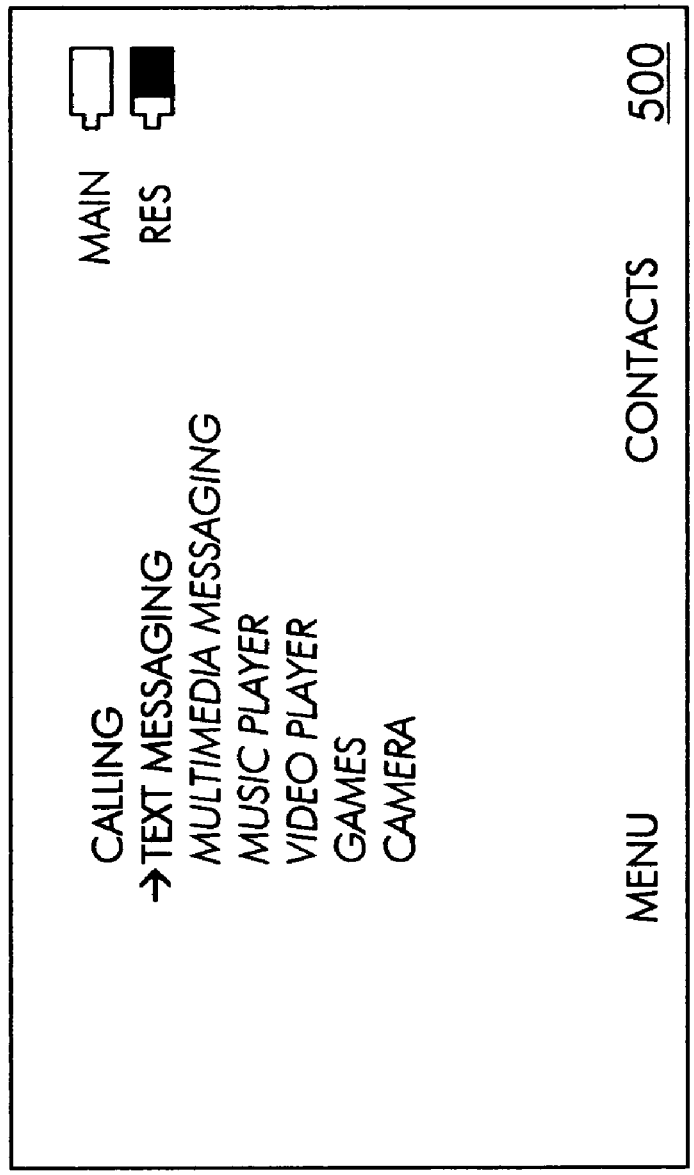
FIG. 5 shows a wireless communication device application initiation user screen in one embodiment of the invention.

Turning now to FIG. 5, an exemplary wireless communication device application initiation user screen 500 is shown in one embodiment of the invention. User screen 500 may be understood in conjunction with FIGS. 3 and 4. User screen 500 is presented to a user of device 100 on a display of user interface 140 in response to previous user menu selections. Menu selections can be made, for example, by inputs on a keypad or manipulation of a touch-sensitive navigation tool. As illustrated on screen 500, dual virtual battery meter icons are presented for respective configured virtual batteries MAIN and RES to provide a graphical indication of how much power remains in each.

Wireless communication device applications are formatted differently on user screen 500 depending on whether they are powered by at least one virtual battery with available power. In the example shown, virtual battery MAIN that powers all device applications has been exhausted, whereas virtual battery RES that powers only the calling and text messaging applications has available power. Thus, the enabled applications (i.e. calling and text messaging) are displayed in plain text whereas the disabled applications (i.e. all others) are displayed in italics. In other embodiments, disabled applications may be removed from the menu altogether or grayed-out. In some embodiments, selection on user screen 500 of disabled applications is blocked. In other embodiments, selection on user screen 500 of disabled device applications is permitted, and when selected by the user a message is presented notifying the user that the selected application is presently unavailable.

In addition, in some embodiments the user is presented with a low battery warning message (e.g. "Warning: MAIN battery low") when a virtual battery nears exhaustion, and a dead battery message (e.g. "Alert: MAIN battery exhausted/ RES battery active") when a virtual battery is fully exhausted. Furthermore, in some embodiments the user screen background may change, for example in color or wallpaper style, to provide a continuous reminder to the user of an adverse virtual battery condition.

Figure 6:
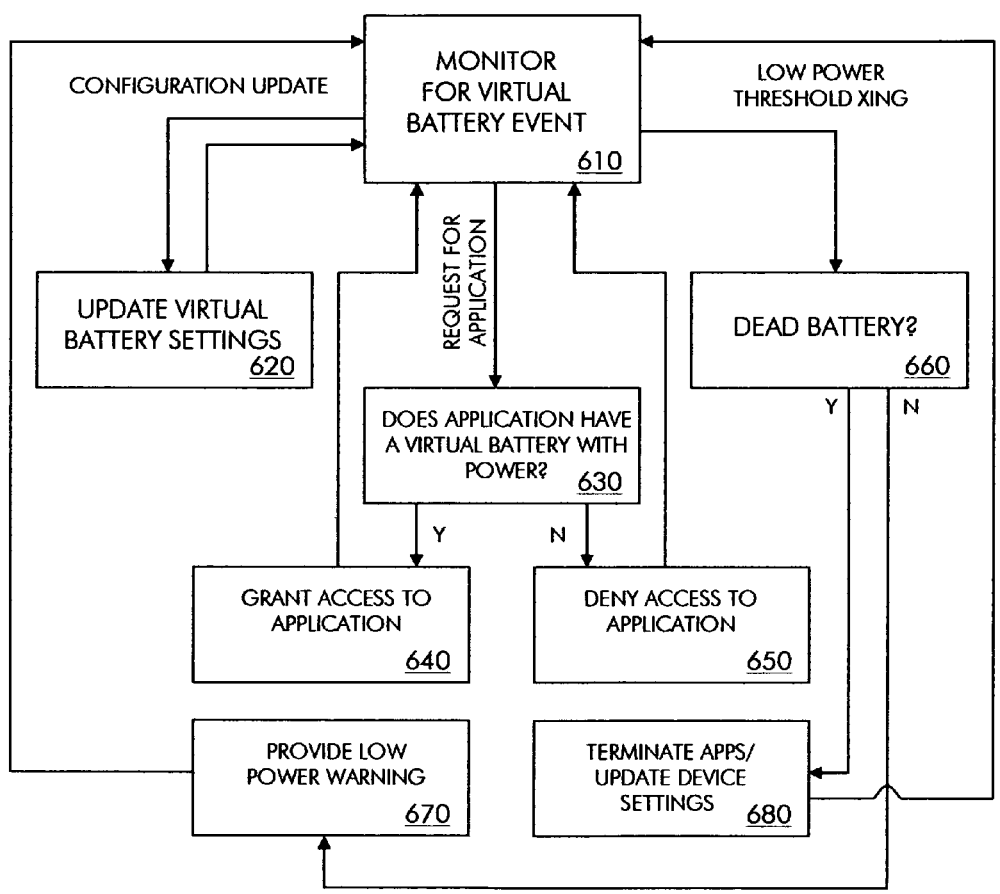
FIG. 6 is a flow diagram showing virtual battery event flows in one embodiment of the invention.

Turning finally to FIG. 6, a flow diagram of virtual battery event flows in one embodiment of the invention is shown. When wireless communication device 100 is booted, device settings 220 and virtual battery settings 230 initialize to current values and operating system 210 begins to monitor for a virtual battery event (610). A virtual battery event may be a configuration update, a request for a device application or a low power threshold crossing.

If a configuration update is detected, operating system 210 updates virtual battery settings 230 in response to valid user inputs on user interface 140 (620). Such updates can be made to virtual battery identity, device applications powered by a virtual battery, power budget of a virtual battery or device settings associated with a virtual battery. If an update is made to the power budget of a virtual battery other than the main battery, the power budget of the main battery is adjusted to keep total battery power allocation at 100%. After updating virtual battery settings 230, operating system 210 monitors for the next virtual battery event (610).

If a request for a device application is detected, operating system 210 determines whether the requested application is powered by a virtual battery that has available power (630) and grants (640) or denies (650) access to the application based on the determination. The determination compares the remaining percentage of overall battery capacity calculated based on the most recent measurement taken by battery monitoring logic 120, or a moving average of such measurements, with the power budgets of virtual batteries that represent the application, starting with the main battery. For example, if the requested application is a text messaging application that is powered by both virtual battery MAIN having a power budget of 75% and virtual battery RES having a power budget of 25% and the remaining percentage of overall battery capacity is between above zero and below 25%, access to the application is granted. On the other hand, if the requested application is a video gaming application that is powered only by virtual battery MAIN having a power budget of 75% and the remaining percentage of overall battery capacity is above zero and below 25%, access to the application is denied. After accepting or denying the request, operating system 210 monitors for the next virtual battery event (610).

If a low power threshold crossing is detected, operating system 210 determines whether there is a dead virtual battery (660). The determination compares the remaining percentage of overall battery capacity calculated based on the most recent measurement taken by battery monitoring logic 120, or a moving average of such measurements, with thresholds set on device 100 based on power budgets of virtual batteries. For example, if a main virtual battery has a power allocation of 75% and a reserve virtual battery has a power allocation of 25%, the operating system 210 pronounces the main virtual battery dead once the remaining percentage of overall battery capacity falls to 25%. If there is a dead virtual battery (680), operating system 210 terminates all active applications and functions that are powered only by the dead virtual battery and device settings 220 are updated with the device settings of a live virtual battery (680). On the other hand, if there is not a dead virtual battery, the threshold crossed is a low virtual battery threshold and operating system 210 causes a warning message to be displayed on user interface 140 (670). After taking the indicated action, operating system 210 monitors for the next virtual battery event (610).

In addition to virtual battery event monitoring, operating system 210 causes virtual battery meter icons displayed on user interface 140 to be continuously updated to keep current the meter levels displayed therein.

It will be appreciated by those of ordinary skill in the art that the invention can be embodied in other specific forms without departing from the spirit or essential character hereof.

The present description is therefore considered in all respects to be illustrative and not restrictive. The scope of the invention is indicated by the appended claims, and all changes that come within the meaning and range of equivalents thereof are intended to be embraced therein.

What is claimed is:

1. A wireless communication device, comprising:
   a user interface adapted to accept one or more inputs from a user; and
   a processor communicatively coupled with the user interface and adapted to configure first and second virtual batteries on the device using the inputs, execute a plurality of applications and monitor for virtual battery events,
   wherein the first and second virtual batteries are each allocated a power budget that represents a dedicated share of physical battery capacity, and
   wherein the power budget of the first virtual battery is allocable to all of the applications and the power budget of the second virtual battery is allocable to only a subset of the applications;
   wherein the processor causes to be displayed and continually updated on the user interface a simultaneous indication of remaining power in the first and second virtual batteries.

2. The wireless communication device of claim 1, wherein all of the applications draw exclusively from the power budget of the first virtual battery while the first virtual battery has power.

3. The wireless communication device of claim 2, wherein applications within the subset draw from the power budget of the second virtual battery once the first virtual battery has been exhausted.

4. The wireless communication device of claim 3, wherein applications outside the subset are terminated once the first virtual battery has been exhausted.

5. The wireless communication device of claim 1, wherein the power budgets of the virtual batteries are not dynamically re-allocable based on utilization.

6. The wireless communication device of claim 1, wherein the inputs specify membership in the subset through user selection of one or more applications from a menu.

7. The wireless communication device of claim 1, wherein the subset includes a calling application.

8. The wireless communication device of claim 1, wherein the subset includes a text messaging application.

9. The wireless communication device of claim 1, wherein the inputs specify the power budget for at least one of the first or second virtual battery.

10. The wireless communication device of claim 9, wherein the inputs specify the power budget in terms of a percentage of physical battery capacity.

11. The wireless communication device of claim 9, wherein the inputs specifying the power budget in terms of a usage time of at least one application.

12. The wireless communication device of claim 1, wherein the processor causes to be displayed on the user interface a warning message when the first virtual battery is near exhaustion.

13. The wireless communication device of claim 1, wherein the device further comprises a wireless interface and the subset is specified in an over-air transmission received via the wireless interface.

14. A method for allocating power on a wireless communication device, comprising:
    accepting one or more user inputs on the device;
    configuring first and second virtual batteries on the device using the inputs;
    executing a plurality of applications on the device; and
    monitoring for virtual battery events on the device,
    wherein the first and second virtual batteries are each allocated a power budget that represents a dedicated share of physical battery capacity, and
    wherein the power budget of the first virtual battery is allocable to all of the applications and the power budget of the second virtual battery is allocable to only a subset of the applications;
    displaying and continually updating on the device a simultaneous indication of remaining power in the first and second virtual batteries.

15. The method of claim 14, wherein all of the applications draw exclusively from the power budget of the first virtual battery while the first virtual battery has power.

16. The method of claim 15, wherein applications within the subset draw from the power budget of the second virtual battery once the first virtual battery has been exhausted.

17. The method of claim 16, wherein applications outside the subset are terminated once the first virtual battery has been exhausted.

18. The method of claim 14, wherein the power budgets of the virtual batteries are not dynamically re-allocable based on utilization.

19. The method of claim 14, wherein the subset includes a calling application.

20. The method of claim 14, wherein the subset includes a text messaging application.

21. The method of claim 14, further comprising the step of displaying on the device a warning message when the first virtual battery is near exhaustion.

* * * * *